Feb. 14, 1950 C. B. GODWIN 2,497,598
TRANSMISSION
Filed Jan. 12, 1946 5 Sheets-Sheet 1
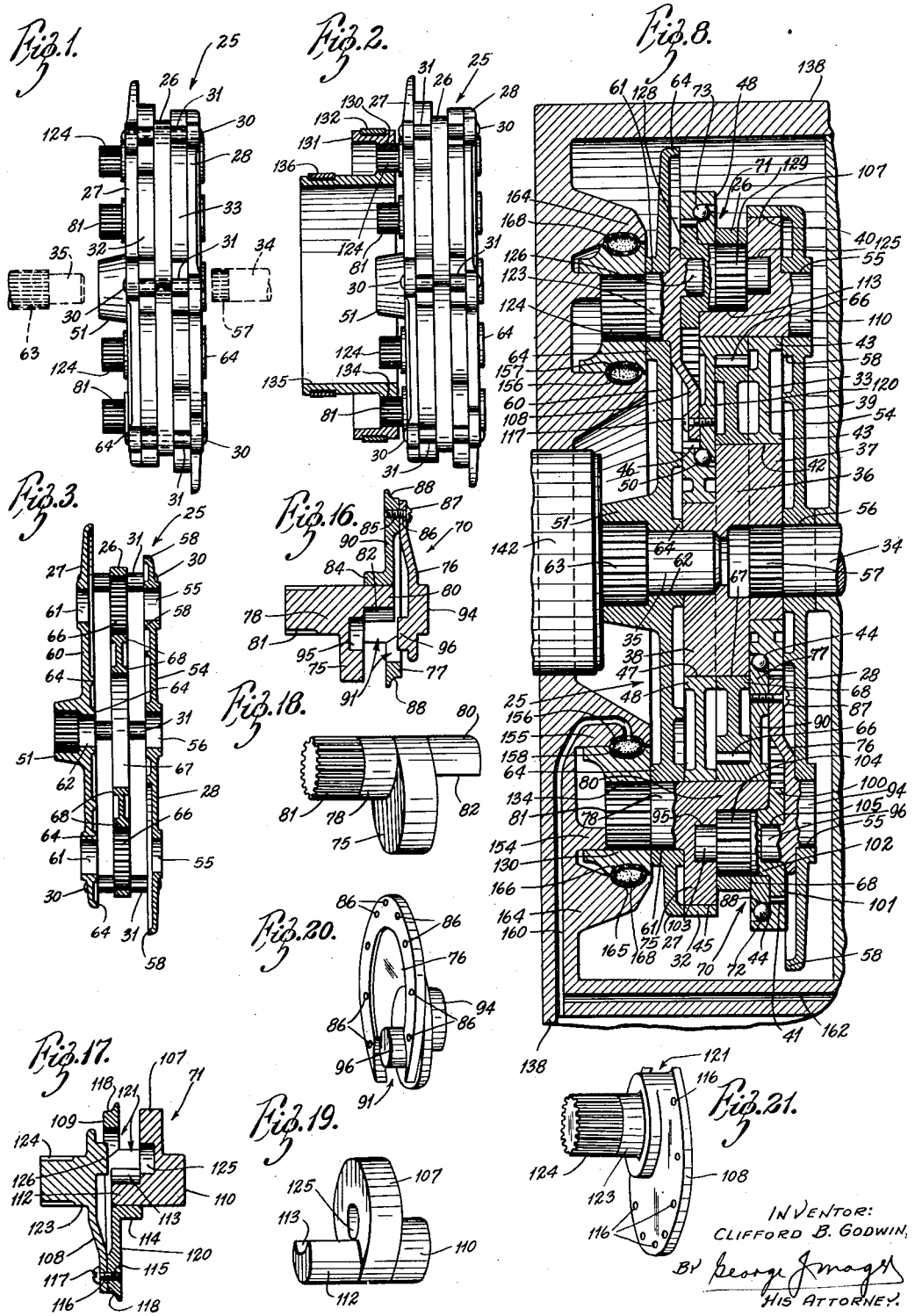
INVENTOR:
CLIFFORD B. GODWIN,
BY George J Mago
HIS ATTORNEY.

Feb. 14, 1950     C. B. GODWIN     2,497,598
TRANSMISSION
Filed Jan. 12, 1946     5 Sheets-Sheet 2
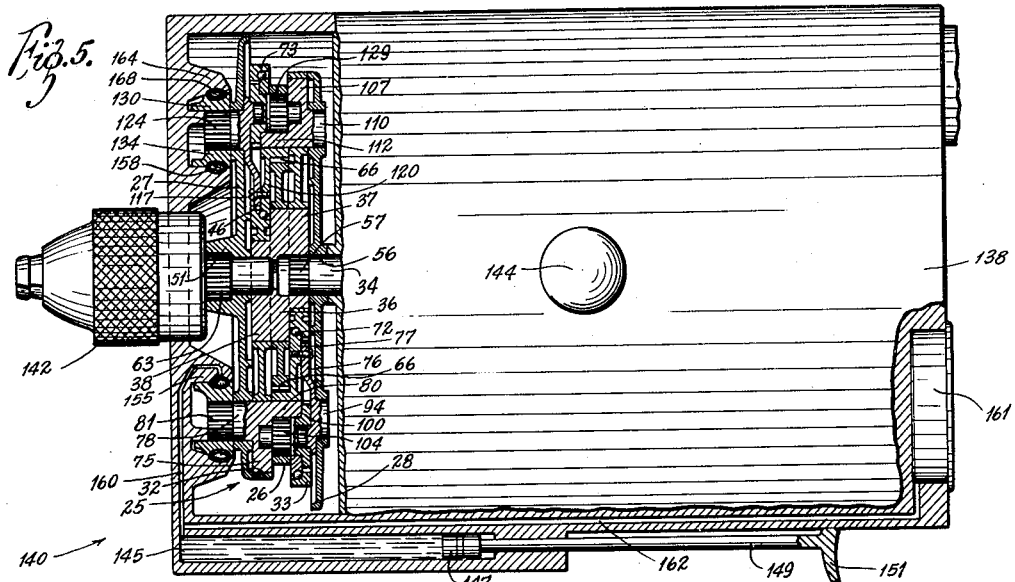
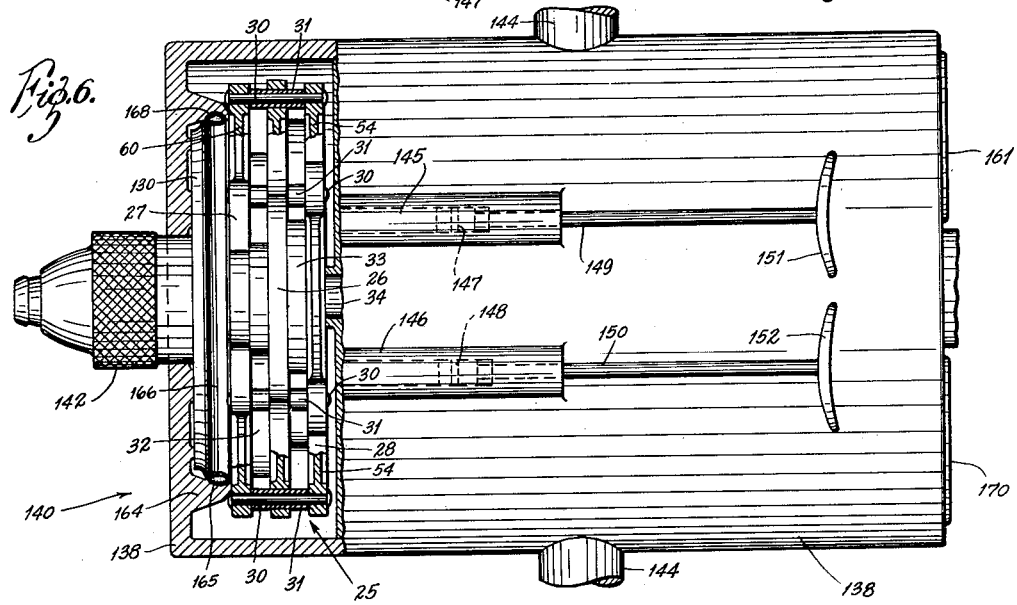
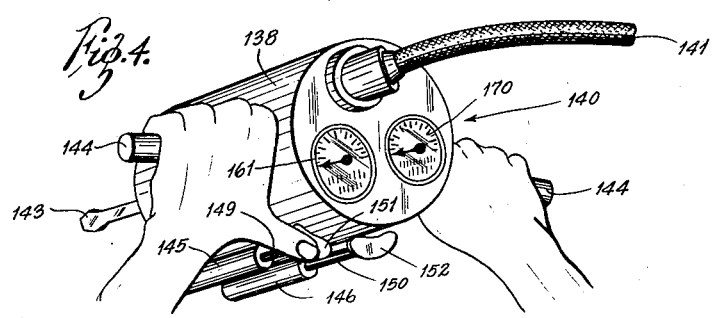
INVENTOR:
CLIFFORD B. GODWIN,
BY George Imogst
HIS ATTORNEY.

Feb. 14, 1950     C. B. GODWIN     2,497,598
TRANSMISSION
Filed Jan. 12, 1946     5 Sheets-Sheet 3
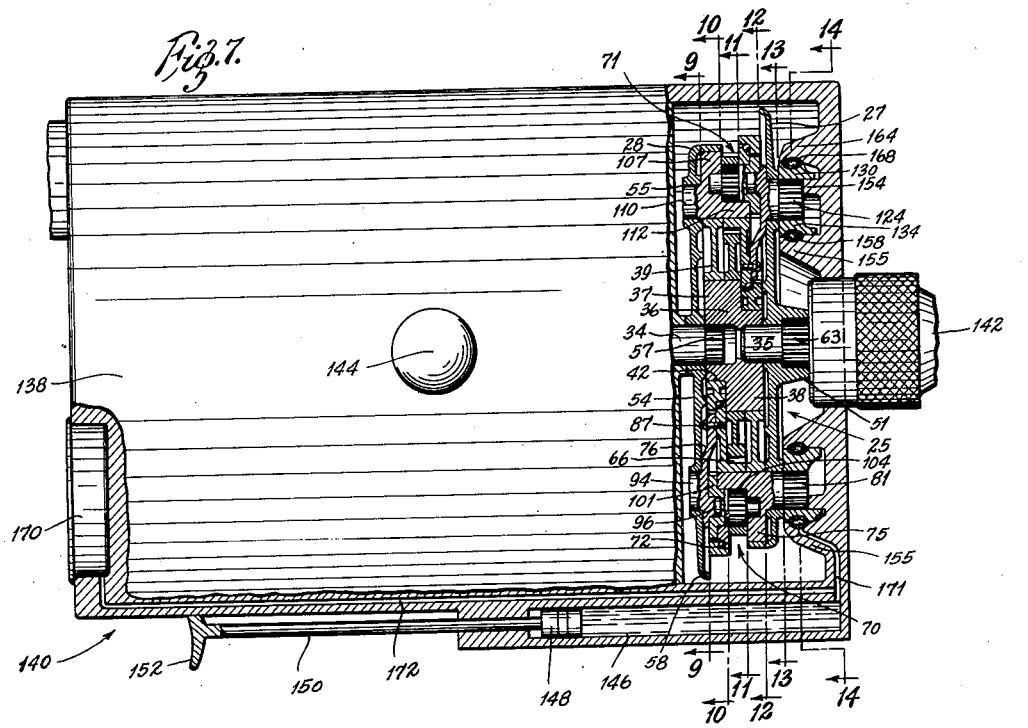
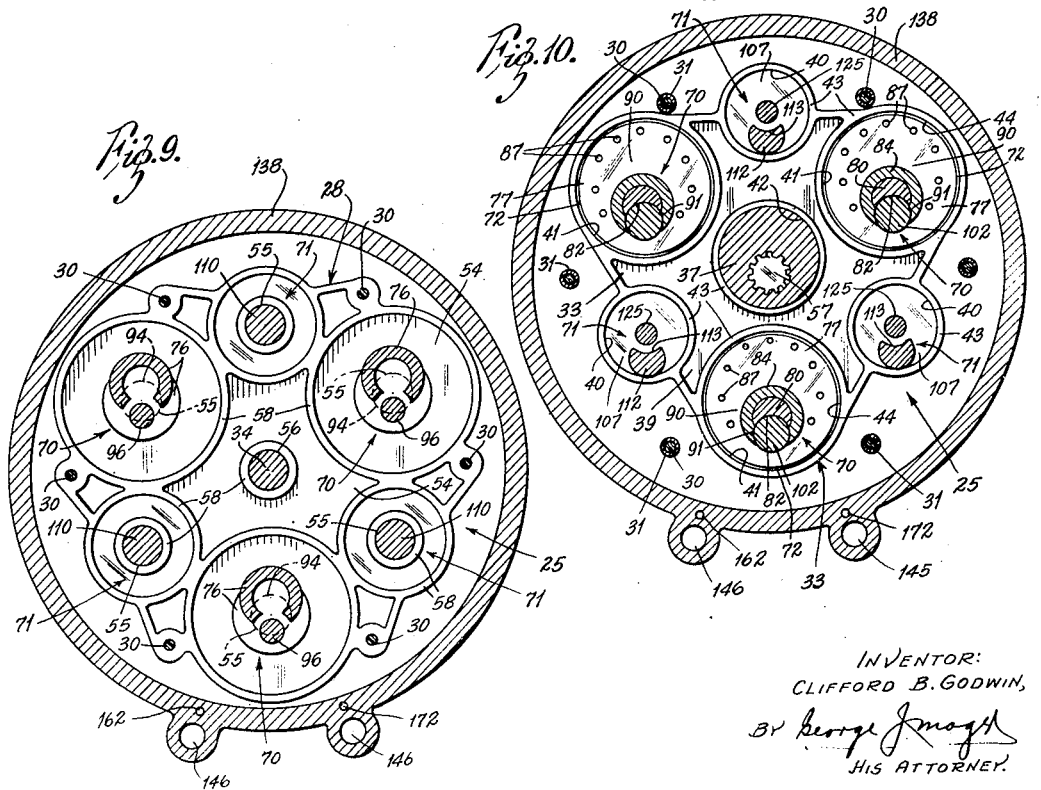
INVENTOR:
CLIFFORD B. GODWIN,
BY George J. Mogh
HIS ATTORNEY.

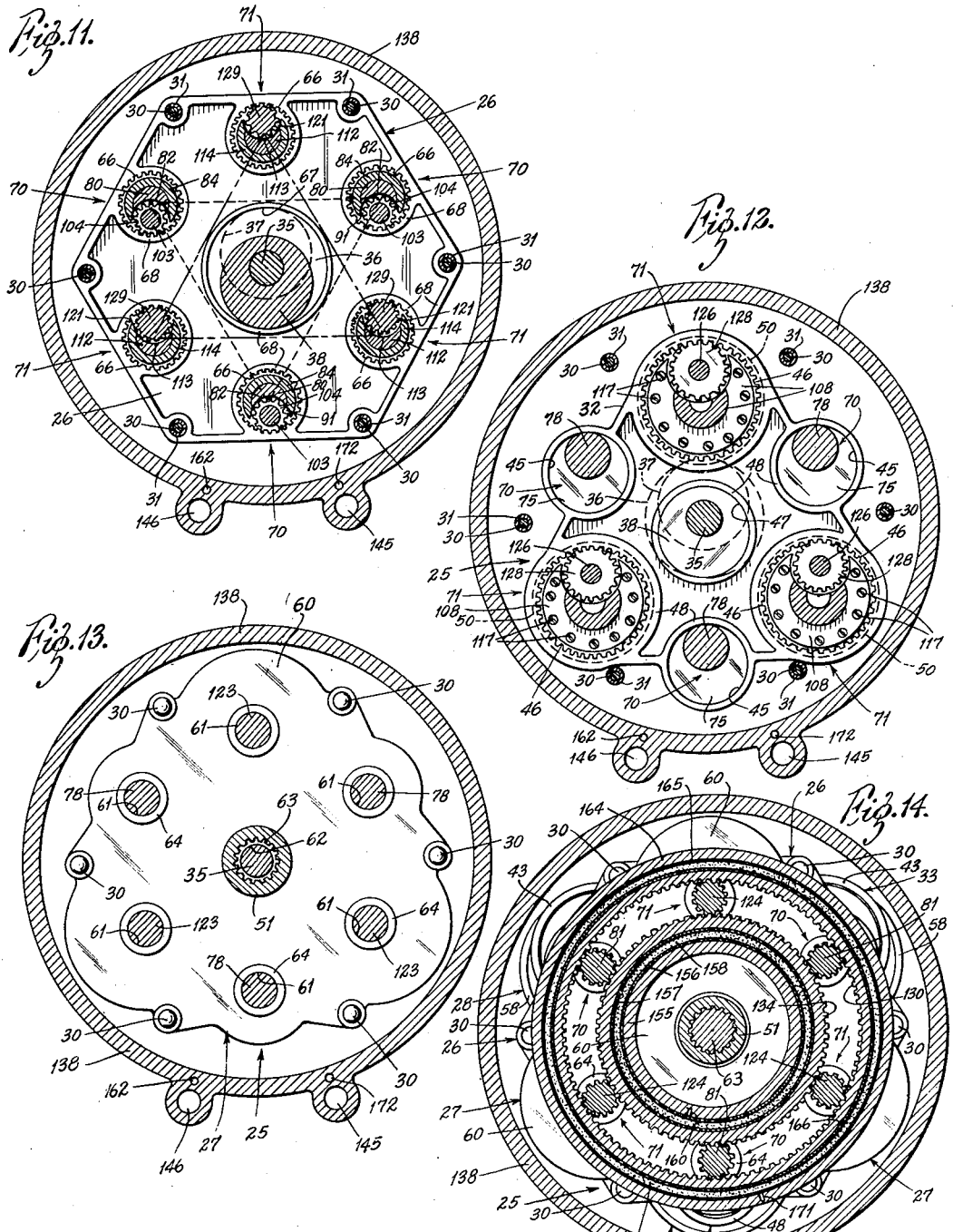

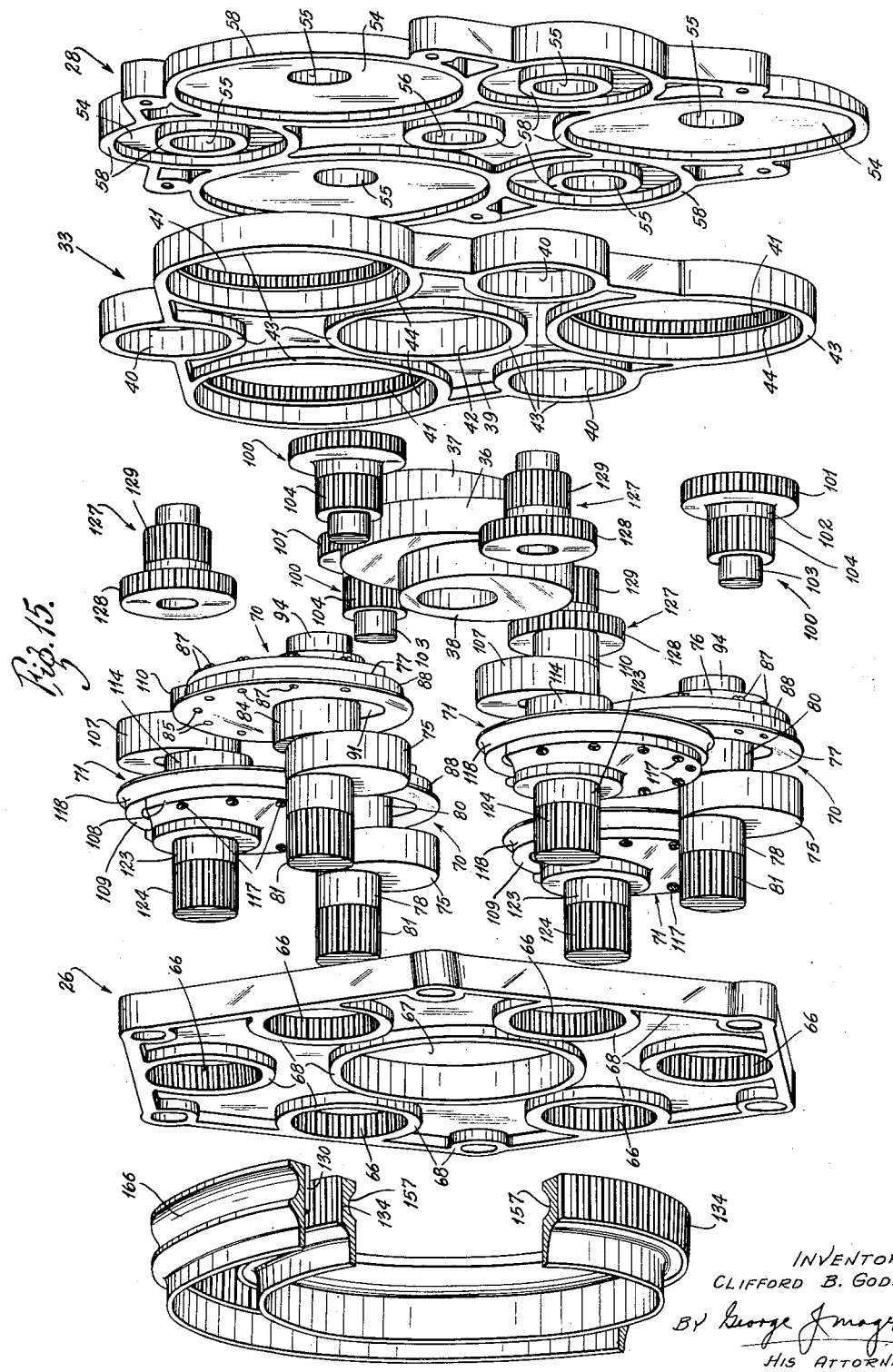

Patented Feb. 14, 1950

2,497,598

UNITED STATES PATENT OFFICE 2,497,598

TRANSMISSION

Clifford B. Godwin, University City, Mo.

Application January 12, 1946, Serial No. 640,829

19 Claims. (Cl. 74—760)

The present invention relates generally to a transmission comprising gearing, and elements associated therewith, adapted to transfer the energy of a rotary drive or power shaft to an ultimate shaft or element to be rotated, with a minimum loss of power, although the rotary speed transmitted to the ultimate or driven shaft is considerably lower than that of the drive shaft.

More particularly, the invention relates to a transmission comprising gearing, and elements associated therewith, adapted to transfer the energy of a rotary drive or power shaft to a driven shaft with a minimum loss of power, wherein the rotary speed of the driven shaft relative to that of the drive or power shaft may be predetermined, and is dependent only upon the ratio of the elements incorporated in the transmission, and on the rotary speed of said drive shaft.

More specifically, the invention comprises an arrangement of gears and other associated elements, whereby the rotary speed of the drive shaft may be transferred to the driven or ultimate shaft so that a reduced predetermined rotary speed of the latter is obtainable with a minimum loss of power.

Further, the invention comprises a transmission embodying the features heretofore mentioned, and which has also incorporated therein means whereby the rotation of the driven or ultimate shaft may be reversed at will, so that it will revolve oppositely to the drive or power shaft, said means obviating the necessity of a clutch and shifter elements in the transmission.

The invention is preferably constructed as a self-contained unit which may be interposed between any prime mover and a second shaft desired to be rotated at a reduced rate of speed in either the same direction or in the opposite direction to that of the prime mover shaft.

The principal object of the invention, therefore, is the provision of a compact transmission capable of producing the results hereintofore designated.

A further object of the invention is the provision of a novel transmission in which reversal of rotation as to the driven or ultimate shaft may be had not only at will, but almost immediately, and without any appreciable vibration or undue strain on the elements incorporated therein, or associated therewith.

Another object of the invention is the provision of a novel mechanism wherein the transfer or transmission of power from the drive or input shaft to the driven or output shaft may be effected by the simple expedient of applying pressure to one or the other of a pair of control elements associated with the mechanism, and forming part thereof.

Another object of the invention is to provide a transmission of this character which, when installed between and connected to the input or drive shaft of a prime mover and the output or driven shaft of an element to be rotated, will have no appreciable effect on the last-named shaft until pressure is applied to stabilize one or the other of a pair of control elements associated with said transmission.

A further object of the invention is to provide a novel transmission mechanism incorporated in and comprising a unitary structure, the elements of which are maintained in operative relation by their complementary elements albeit the transmission is not installed between a prime mover and an element to be driven, and which, when so installed, is highly efficient in reducing the speed of the input shaft to the speed desired in the output shaft, and transmitting the same to the latter shaft with a negligible loss of power.

Yet another object of the invention is to provide a transmission assembly whose operating parts are maintained in proper relation between a pair of cover or end plates, and an intermediate plate in spaced relation, in such manner that end play and other undesirable defects ordinarily present in transmission devices are automatically eliminated.

A further object is the provision of an output member comprising a unitary assemblage of three spaced, parallel plates, so arranged and correlated with the other elements of the invention, that a combination of forces in a circular series of bearings on a planetary orbit in the two end plates, together with pressures engendered around the peripheral gear teeth of a circular series of internally cut openings in the intermediate plate, effect the rotation of said output member or unit in clockwise or counterclockwise direction, as desired.

It is also an object of the invention to provide means associated with the transmission adapted to register and visually indicate to an observer the measure of pressure applied, and the torque present, or which may be present, in the driven or output shaft when it, or an element rotated thereby, is subjected to constant or varying degrees of resistance.

Other objects and advantages of the invention not specifically mentioned hereinbefore will be apparent or referred to in the description to follow, reference being also had to the accompanying drawings which form part of this specification. In some of said drawings, the transmission of this invention is shown applied to a power-operated hand tool for illustrative purposes only, it being understood that, as hereinbefore mentioned, the invention is applicable to numerous other devices.

In said drawings:

Fig. 1 is a side elevation of the transmission of my invention assembled as a unit, the input or power shaft of a prime mover, and the output or ultimate shaft of an element to be rotated, being indicated in broken lines;

Fig. 2 is a similar view with a pair of control members added thereto and illustrating, more or less diagrammatically, one means of selectively changing the rotational direction of the output shaft relative to the input shaft;

Fig. 3 is a vertical sectional view of a three plate assembly per se, said assembly constituting what shall hereinafter be referred to as the output member of the transmission;

Fig. 4 is a perspective view of a power-operated hand tool wherein an embodiment of the invention is incorporated;

Fig. 5 is a side elevational view of said tool, the casing being broken away to illustrate the inclusion of the transmission of this invention, the latter being shown in vertical cross section;

Fig. 6 is a bottom plan view of Fig. 5, the casing again being broken away to illustrate the location of said transmission, which, in turn, is broken away to illustrate a preferred means of assembling the various components of the transmission into a unitary structure;

Fig. 7 is a view similar to Fig. 5 as it appears when viewed from the opposite side;

Fig. 8 is a reproduction on an enlarged scale of the left hand portion of Fig. 5;

Figs. 9, 10, 11, 12, 13 and 14 are vertical sectional views taken respectively on the lines 9—9, 10—10, 11—11, 12—12, 13—13 and 14—14 in Fig. 7, the background appearing beyond the section lines being omitted, except in Fig. 14;

Fig. 15 (taking up one entire sheet of drawing) is an exploded view illustrating, in perspective, some of the principal elements of the transmission in disassembled but aligned relation, all spur gear teeth being shown conventionally;

Fig. 16 is an axial sectional view of one of a series of three identical bushings or gear supporting structures included in an assembly, each of which will be referred to hereinafter as an inner auxiliary journal assembly;

Fig. 17 is a similar view of one of a series of three identical bushings or gear supporting structures included in an assembly each of which will hereinafter be referred to as an outer auxiliary journal assembly;

Fig. 18 is a perspective view of an eccentric or cam member included in the inner auxiliary journal assembly portrayed in Fig. 16;

Fig. 19 is a perspective view of a similar member included in the outer auxiliary journal assembly portrayed in Fig. 17;

Fig. 20 is a perspective view of a cut-away disc member also included in the inner auxiliary journal assembly illustrated in Fig. 16; and Fig. 21 is a perspective view of a similar member also included in the outer auxiliary journal assembly illustrated in Fig. 17.

The unitary structure comprising the transmission of the invention is illustrated in side elevation in Fig. 1, and is generally designated by the numeral 25. It includes a center plate 26, a left or front cover plate 27, and a right or rear cover plate 28. These three plates are maintained in rigid, spaced relation by means of a circular series of bolts or rivets 30 and sleeves 31, shown particularly in Fig. 6.

There is thus formed a cage assembly wherein the principal elements of the transmission are confined, and which assembly will hereinafter be termed the output member. It is shown, per se, in vertical cross section in Fig. 3.

In the interstice between the front cover plate 27 and the center plate 26 is positioned an actuator member or plate 32, and a similar actuator member or plate 33 is positioned between said center plate and the rear cover plate 28. The actuators are free to move relative the center and cover plates, and relative one another.

When assembled, the five plates are parallel and in intimate contact with one another along portions of their peripheral margins, thus supporting one another, obviating end play, and serving to maintain antifriction bearings in place, as will appear.

In Fig. 1, the splined end of an input or drive shaft 34 of a prime mover is shown by broken lines in position for insertion into the transmission mechanism at the rear, and, similarly, the splined end of an output or driven shaft 35 is shown in position for insertion into the mechanism at the front.

For illustrative purposes only, the transmission is shown in some views of the accompanying drawings as associated with a power-operated hand tool. However, in the detailed description to follow immediately, the other elements included in the transmission will be described without reference to said tool.

On the center axis, central to the mechanism 25 as a whole, a main, hollow journal member 36, supported for rotation in a bearing to be described, has formed integrally therewith, in the manner of a crankshaft, two identical circular bosses or trunnions 37 and 38, also supported for rotation in bearings. These two trunnions are smaller in diameter than the middle portion of said main journal, and are formed on either side thereof in offset, that is, diametrically opposed relation to one another, and parallel to and equidistant from said center axis.

The main journal member 36, with its integral, eccentrically disposed, smaller trunnions 37 and 38, is adapted to be rigidly connected at one side thereof to the power or drive shaft 34 of a prime mover, whereby the main journal 36, with its integral trunnions, and the drive or input shaft 34 will rotate in unison.

At such time, whereas the central portion of the journal member revolves about the center axis, bearings in the actuators, which surround the two eccentrically disposed trunnions, travel along a planetary path and have their axes in equivalent orbits which lie symmetrically disposed about said center axis.

Therefore, while the bearing which surrounds the central portion of the main journal 36 is unaffected by the rotation thereof, the bearings which surround the trunnions are caused to travel in circular orbits concentric with said center axis, and which are designated primary eccentric orbits.

There are other orbits which are eccentric to said center axis, and for each of these orbits, symmetry around the center axis does not exist, and they are designated the secondary eccentric orbits. The radius of orbit for the primary and secondary eccentric orbits determines the eccentricity which, in this case, is identical.

That is to say, the path of any primary eccentric orbit, and the path of any secondary eccentric orbit is similar. However, the center from which the radius of the primary orbit emanates coincides with the said center axis of the device, whereas any center from which the radius of any secondary orbit emanates is offset from said center axis. The purpose of this arrangement will be more fully set forth hereinafter.

Rotatively mounted on each of said trunnions is an actuator, the actuator 33 on the trunnion 37, and the actuator 32 on the trunnion 38. Both actuators are identical in every respect and each has formed in the web portion 39 thereof a circular series of three openings which are bearings, and a circular series of three openings each provided with an internal ring of spur gear teeth. These bearings and internal ring gear openings are arranged alternately with their center points equidistant from the center axis, and equidistant from one another. Thus, the radial distance from said center line is common to the axial position of each series, and geometrical symmetry obtains.

The configuration of actuator 33 is best seen in Fig. 10, and the bearing openings therein just described are designated by the numerals 40, and its internally gear-cut openings by the numerals 41. This actuator is provided, also, with a central opening 42 which forms the bearing for the offset trunnion 37 of the main journal.

The three bearing openings 40, and the bearing opening 42 are each surrounded by an annular, laterally extending flange portion 43, the purpose of which will be explained hereinafter, as will the purpose of a smooth, rounded, annular shoulder 44 formed adjacent each of the three gear-cut openings 41.

The configuration of the actuator 32 is identical, as best seen in Fig. 12, and the corresponding bearing openings formed therein are designated by the numerals 45, its internally gear-cut openings by the numerals 46. Actuator 32 is provided also with a central opening 47 forming the bearing for the offset trunnion 38 of the main journal.

The three bearing openings 45, and the bearing opening 47 are each surrounded by an annular, laterally extending flange portion 48, and a smooth, rounded, annular shoulder 50 is formed adjacent each gear cut opening 46.

The front and rear cover plates 27 and 28, respectively, are identical in every respect except that the front plate is provided with a central, forwardly extending, internally splined hub 51, not present in the rear plate 28, for the reception of a splined shaft 35.

Each cover plate has formed therein a circular series of six openings or bearings whose center points coincide in all respects with those of the bearings and gear ring openings in the actuators.

The shape of the rear cover plate 28 is best seen in Fig. 9, and each of the said circular series of bearing openings formed in the web portion 54 thereof is indicated by the numeral 55. A central opening or bearing 56 is also formed in said web to support the input shaft 34 adjacent the splined end 57 thereof.

The six bearing openings 55, and the central bearing opening 56 are each surrounded by an annular, laterally extending flange portion or portions 58, the purpose of which will also appear hereinafter.

Attention is directed to the rear cover plate 28 shown perspectively in Fig. 15, wherein the annular flanges 58 appear to best advantage, as do the annular flanges 43 of actuator 33, previously described.

The configuration of the front cover plate 27, with the single exception hereintofore mentioned, is of identical construction, and each of the said circular series of six bearing openings formed in the web portion 60 thereof is indicated by the numeral 61.

A central bearing opening, or pilot hole 62 is also formed in said web to receive and support the output shaft 35 adjacent the splined portion 63 thereof. Annular, laterally extending flange portions 64, similar to the flange portions 58 of the rear cover plate, surround the bearings 61 and 62.

The center plate 26 has formed therein a circular series of six openings 66, whose inner peripheries are provided with spur gear teeth. The center points of these openings, relative the axis of the center plate, are identical with the center points of the openings in said cover plates and said actuators.

In other words, all of the bearings and internal cut ring gear openings formed in the cover plates, the actuators, and the center plate, would register on a series of six planetary axes, should the five plates be symmetrically superimposed upon one another with their central axes in alinement.

When assembled in operative relation, however, the planetary axes of the six openings in the actuator 32 and in the actuator 33 are offset from, or out of registry with the planetary axes of the similar openings in the cover plates and the center plate, since the actuators are rotatably mounted on the eccentrically formed trunnions 38 and 37 of the main journal 36.

The center plate 26 has also formed therein a central opening 67, which constitutes the bearing for the middle or non-eccentric portion of said main journal. All of the openings in the center plate are surrounded by annular, laterally extending flanges, shown to best advantage also in Fig. 15, and indicated by the numerals 68.

It should now be evident that the input member (Fig. 3) is rotatable about the center axis, whereas the actuators are rotatable about the axes of the offset trunnions.

Referring now more particularly to Figs. 15 to 21, inclusive, the designated inner and outer auxiliary journal assemblies will be described. As shown in the drawings, there is a series of three inner auxiliary journal assemblies, each indicated as a whole by numeral 70, and supported for rotation on a circular series of ball bearings 72. There is, likewise, a series of three outer auxiliary journal assemblies, each indicated as a whole, by the numeral 71, and supported for rotation on a circular series of ball bearings 73.

The term "inner," as here employed, has reference to the three auxiliary journal assemblies whose supporting ball bearings 72 are in substantial vertical alinement with the splined end 57 of the input shaft 34.

The term "outer," as here employed, has reference to the three auxiliary journal assemblies whose supporting ball bearings 73 are in substantial vertical alinement with the end of the output shaft.

Attention is directed to Fig. 11, wherein for a better understanding of the relative position of these assemblies, one of the series of three inner assemblies 70 appears in section at each apex of the equilateral triangle indicated in broken lines, and wherein one of the series of three outer assemblies 71 appears in section at each apex of an equilateral triangle indicated in dot and dash lines.

Each of the three inner and outer auxiliary journal assemblies embodies three elements formed into a rigid unit. Thus, an assembly 70 (Fig. 16), includes the eccentric or cam member 75, shown in perspective in Fig. 18, the cut-away disc member 76, shown in perspective in Fig. 20, and the annular inner raceway member 77 for the ball bearings 72. An integrally formed stud 78 projects from the cam on one side, and a similar stud 80 on the opposite side. Formed on the extremity of the stud 78 is a pinion 81, and the stud 80 is cut away and dished out, as at 82, to accommodate a pinion, to be later described.

The raceway member 77 is provided with a hub 84, which is soldered or welded to the stud 80, and is provided with an annular series of spaced, threaded holes 85, which register with a similar series of holes 86 in the element 76. Screws 87 maintain the two parts in rigid relation. The ball bearing raceway proper is indicated 88. The hub 84, a portion of the web 90 of the raceway member 77, and a portion of the disc 76 are cut away and hollowed out, as at 91, to form a cavity for the reception and proper positioning therein of a spur gear integral with the pinion alluded to above.

With reference to the inner auxiliary journal assemblies 70, the principal axis (which coincides with the planetary axis of the openings in the output member), is that axis common to the pinion 81, stud 78, stud 80, and a trunnion 94, integrally formed on one side of the disc 76. The axis of the raceway member 77 is eccentric to said principal axis in one direction. The axis of the cam 75, a central cavity or bearing 95 herein, and a trunnion 96 formed on the other side of said disc, is eccentric to said principal axis in the opposite direction.

Each inner assembly is primarily supported in the output member by its trunnion 94, which is disposed in one of the bearings 55 of rear cover plate 28, and by the stud 78, which is disposed in one of the bearings 61 of the front cover plate 27, with pinion 81 protrudent.

A spur gear and pinion unit, previously alluded to, and which will hereinafter be called the appendage gear, is associated with each inner journal assembly and is generally designated 100. It comprises a spur gear 101, an integral shaft 102 terminating in a reduced end portion 103, a pinion 104 formed adjacent said reduced end, and a bearing cavity 105.

When in position within the journal assembly 70, the appendage gear is freely rotatable, with the end portion 103 of its shaft in the bearing 95 of the cam member, and the trunnion 96 of the disc 76 in the bearing 105, as best seen in Fig. 8. Thus, the appendage gear is co-axial with the cam 75, and, therefore, eccentric to the said principal axis.

Each outer auxiliary journal assembly 71 (Fig. 17), includes an eccentric or cam member 107 shown in perspective in Fig. 19, a cut-away disc member 108, shown in perspective in Fig. 21, and an annular inner raceway member 109 for the ball bearings 73. An integrally formed trunnion 110 projects from the cam on one side, and a stud 112 on the opposite side, which is cut away and dished out, as at 113.

The raceway member 109 has a hub 114, which is soldered or welded to the stud 112, and is provided with an annular series of spaced threaded holes 115, adapted to register with a similar series of holes 116 in the element 108, and to receive screws 117. The ball bearing raceway proper is designated 118, and the hub 114, a portion of the web 120, and a portion of the disc 108, are cut away and hollowed out, as at 121, to form a cavity.

An integrally formed stud 123 projecting from one side of the disc 108 terminates in a pinion 124, similar to the pinion 81 of the inner journal assembly.

With reference to the outer auxiliary journal assemblies, the principal axis is that common to the pinion 124, stud 123, stud 112 and trunnion 110. The axis of the raceway member 109 is offset from the said principal axis in one direction. The axis of the cam 107, a central cavity or bearing 125 therein, and a trunnion 126, projecting from the other side of the disc 108, are offset from the principal axis in the opposite direction.

Each outer assembly 71 is primarily supported in the output member by its trunnion 110, which is disposed in one of the bearings 55 of rear cover plate 28, and by the stud 123, which is disposed in one of the bearings 61 of the front cover plate 27, with pinion 124 protrudent.

As in the case of the inner auxiliary journal assemblies, each outer assembly has an appendage gear unit, generally designated 127, associated therewith. It is of the identical construction as the appendage gear 100, and includes a spur gear 128 integral with a shaft terminating in a reduced end portion, a pinion 129 formed on the shaft adjacent said reduced end, and a bearing cavity for the trunnion 126.

When in position within the auxiliary journal assembly 71, the appendage gear 127 occupies a position reversed end for end from that of the appendage gear 100, with its reduced shaft extremity in the bearing 125, and the trunnion 126 in the bearing formed therein at the opposite end, as appears particularly in Fig. 8. Thus the appendage gear is co-axial with the cam 107, and therefore eccentric to the principal axis of the journal assembly.

It should now be apparent that the transmission mechanism thus far described, when properly assembled, results in the compact, unitary structure portrayed by the unbroken lines of Fig. 1. The rivets 30, which pass through the three plates of the output member, but not through the actuators, serve to maintain all of the gearing, cams, and ball bearing assemblies in proper position.

The three annular shoulders 44 in the actuator 33 form the outer raceway members for the ball bearings 72, and the three annular shoulders 50 in the actuator 32 form the outer raceway members for the ball bearings 73.

The laterally extending annular flanges which are disposed within the casing or housing and which surround the openings in the plates, present bearing surfaces to one another, and to other elements in contact therewith, and are so formed and located as to obviate end play, eliminate friction, and insure smooth operation.

As previously mentioned, assuming now that the present mechanism be installed between and connected to a rotating drive shaft and the shaft of an element to be rotated, there will be no appreciable effect on the last-named shaft until one or the other of a pair of control elements associated with the transmission is brought into play.

The construction of these control elements may vary in some respects for different installations, with one exception. In other words, one of them must include an internally cut ring gear of a size to surround and mesh with the circular series of alternate, identical pinions 81 and 124, whereas, the other control must include an externally cut ring gear of a size to fit within and mesh with said pinions.

Braking of the internal gear control element and release of the other causes the output member to rotate in one direction; braking of the external gear control element and release of the other causes the output member to rotate in the opposite direction.

The means employed to effect the braking of a selected control may also vary. Preferably, but not necessarily, it may be accomplished by the application of pressure to an integral portion of one control, and simultaneous release of pressure on the other.

With reference to Fig. 2 only, a control arrangement exemplifying the foregoing is illustrated in vertical section. In this view, the control with the internal ring gear is designated 130 and is provided with an integral, laterally extending brake drum 131, which may be acted upon by a brake band 132 to cause the control to remain stationary.

Similarly, the control member with the external ring gear, designated 134, has an integral, laterally extending brake drum portion 135, which may be acted upon by a brake band 136 to cause this control to remain stationary. Obviously, suitable linkage or other means may be employed for the release of the brake band 132 simultaneously with the application of the band 136, or vice versa.

In some installations, the invention also contemplates an arrangement whereby the measure of torque present in the output shaft may be registered, preferably on visible dials.

For a better understanding of the features of the invention and of its operation, incorporation of it in the casing 138 of a practical, commercial, power-operated hand tool, generally designated 140, is shown in Figs. 4 to 14, inclusive. Within the casing is a motor, not shown, which rotates the drive or input shaft 34 at relatively high speed, the motor being connected to a suitable source of power by means of a flexible electric cable 141.

The element to be rotated at a reduced rate of speed and rigid with the driven or output shaft 35 is a chuck 142, adapted to receive a bit, auger, reamer, or the like, a screw driver 143 being illustrated in Fig. 4.

A pair of handles 144 project laterally from the casing 138, and a pair of hydraulic cylinders 145 and 146 depend therefrom. Manually reciprocable pistons 147 and 148 have their rearwardly extending piston rods 149 and 150 respectively, terminating in thumb-pieces 151 and 152.

The control element including the internal ring gear 130, which, it will be assumed, when braked, will effect counterclockwise rotation of the output member (as viewed by the operator), is rotatively mounted on a circular boss 154 formed on the front wall of the casing 138, and concentric with the center axis.

The control element including the external ring gear 134, which, when immobilized, will effect clockwise rotation of the output member, is rotatively mounted on a similar boss 155, of smaller diameter.

An annular, approximately semicircular recess or groove 156 is formed in the external peripheral surface of the boss 155, and a similar complementary groove 157 in the internal periphery of the member 134. A fluid-filled, resilient, tubular annulus, or bladder 158, positioned between said grooves, as shown particularly in Figs. 5 and 8, is in hydraulic communication with the cylinder 145 by way of a conduit 160. Hydraulic communication between the bladder 158, the cylinder 145, and a conventional pressure registering and indicating instrument 161 is had by way of passage 162 opening into conduit 160, as shown.

It should now be manifest that thumb pressure applied by the operator to the member 151 will cause expansion of the bladder 158 so as to lock the control element 134 against rotation. The measure of pressure applied will be indicated on the dial of the instrument 161, for purposes that will appear.

Also formed on the front wall of the casing 138 is a third concentric boss 164. An annular groove 165 is formed in the internal periphery thereof, and a like complementary groove 166 in the external peripheral surface of the control element 130. A fluid-filled, resilient tubular annulus or bladder 168, positioned between said grooves, as shown in Figs. 7 and 8, is in hydraulic communication with cylinder 146 and a second conventional torque registering and indicating instrument 170, by way of the conduits 171 and 172.

Manifestly, thumb pressure applied to the member 152 will cause the bladder 168 to expand and thus lock the control element 130 to the casing boss 164, and against rotation. The measure of pressure applied in this instance will be indicated on the dial of the instrument 170.

It is to be noted that, whereas the cylinders and passages described in the paragraphs immediately preceding are shown as being formed integrally with and within the casing 138, such showing has been selected for illustrative purposes only, it being understood that equivalent structure may be embodied in other installations, if desired.

An example of the operation of the transmission in use will now be given with particular reference to Figs. 4 to 14, inclusive. It will be assumed that the input shaft 34 is rotating counterclockwise, as viewed by the operator, and that the ultimate element to be rotated clockwise, at a reduced rate of speed, is the screw driver 143.

Assuming, also, that the operator's hands are grasping the handles 144 without exerting any pressure on either of the members 151 or 152, insertion of the tip of the screw driver 143 into the kerf of a screw without shutting off the motor is an extremely simple matter, since, until one or the other control elements 130 or 134 is caused to remain stationary, both of them are idlers, and consequently there is no tendency to impart appreciable torque to said screw driver.

Assuming further that the tip is properly positioned in the kerf, the operator applies thumb pressure to the member 151, moving the piston 147 forwardly and thereby effecting the expansion of bladder 158, and locking the control 134 against rotation. At this time, only the control element 130 idles about its bearing boss 154, the bladder 168 being contracted, as will be understood, although this latter particular condition of said bladder is not illustrated in the drawings.

Simultaneously, the output member 25 and with it the shaft 35, chuck 142, and screw driver 143 rotate clockwise, the ultimate element 143 at a predetermined reduced rate of speed relative the input shaft 34. In the particular transmission illustrated, the components are so proportioned that the resultant speed reduction is approximately 9 to 1, assuming the speed of the drive shaft 34 to be approximately one thousand revolutions per minute.

Generally speaking, the invention consists of mechanical linkage in cooperation with mechanical gearing interposed between the input shaft 34 and the output shaft 35, both of which are on the center axis.

The main journal 36, rigid with shaft 34, rotates clockwise at all times and constitutes the initial element of the mechanical linkage. The output member or unit 25 of Fig. 3, rigid with shaft 35, rotates either clockwise or counterclockwise, depending upon which of the control members is maintained stationary. It constitutes the final element of the mechanical linkage.

The central bearings 47 and 42 of the actuators 32 and 33, respectively, are caused to travel clockwise, also in circular orbits concentric to said center axis, and which have been heretofore designated the primary eccentric orbits, whereas, the circular series of openings 45 and 46 of actuator 32 and the similar series of openings 40 and 41 of actuator 33 may revolve in circular orbits eccentric to said center axis, and which have heretofore been designated the secondary eccentric orbits.

In other words, the primary eccentric orbits are the circular paths along which the axes of the central bearings of the actuators travel bodily, they being mounted on the eccentric trunnions 37 and 38, whereas, the secondary eccentric orbits are the circular paths along which the axes of the openings 40 and 41 of actuator 33, and the openings 45 and 46 of the actuator 32 may independently travel.

The two actuators 32 and 33, are caused to move in synchronism and in constant phase relationship by the rotation of the main journal eccentrics 38 and 37, respectively. In other words, as will be seen, there are two motions which are alike but of opposite phase, being one hundred and eighty degrees apart, and this permits forces to impinge upon each of the three auxiliary journal assemblies 70 and 71.

Inasmuch as the series of assemblies 70 and the series of assemblies 71 function in identical fashion from the standpoint of a train of mechanical linkage, the description immediately to follow will deal with only one of the assemblies of one series; that is, the action of one inner auxiliary journal 70, and its associated appendage gear 100, will be described.

As mentioned, the appendage gear 100 is supported by the said journal assembly 70 for rotation in a cavity therein, so that together they form a unit, and any subsequent independent reference to the appendage gear or the journal assembly shall be deemed not to impair their relativity.

In order to clarify the meaning of the foregoing, an inspection of Figs. 8, 15, 16 and 18 is now invited. In Fig. 15, the appendage gear 100 referred to may be any one of the three illustrated near the central portion of the view. In Fig. 16, an inner auxiliary journal assembly 70 is shown in section, with the appendage gear 100 associated therewith being omitted. In Fig. 18, an eccentric or cam assembly, previously described and included in Fig. 16, is shown per se.

The assembled relationship of these parts is best shown in the lower portion of Fig. 8. There it is seen that the axis of the raceway member 77 is eccentric to the axis of parts 78 and 81, it being noted that the axis of the latter coincides with the planetary axis of the aligned openings 61, 66, and 55 in the output member 25. It is also seen that the axis of the cam member 75 is eccentric to the axis of said parts 78 and 81, but in a plane which is diametrically opposite that of the axis of the raceway member 77.

Because of this arrangement, rotation of the raceway member 77 about its axis in a clockwise manner will effect the counterclockwise rotation of the cam member 75 about the axis of the latter, which directional movement is transmitted to the output member, so that it also will turn counterclockwise.

Simultaneously, since the bearings for the raceway members 77 and the cam members 75 are formed in the actuators 32 and 33, rotation of the latter is also effected.

The motion of the actuators can be presented perhaps more clearly by example. For instance, assuming that a definite fixed point on the surface of either actuator be selected, then that selected point is governed by a two-fold circular motion, it being in simultaneous movement or two circular paths so that the ensuing motion of said point is the resultant of the two.

One of the circular motions referred to is along a circumference which substantially corresponds to the secondary eccentric orbit of relatively small radius, and the center axis of the transmission lies outside this circular motion. The other circular motion referred to is on an orbit of larger radius, and the center axis lies inside of this orbit.

With the foregoing in mind, the function of the auxiliary journal assemblies and associated appendage gears in the mechanical gear train, which is interposed between the actuators and the output member, will be clarified.

The output member (Fig. 3), whose clockwise or counterclockwise rotation is governed by the control members 130 or 134, receives a force on the pitch line of its internal gears 66. The latter are under the influence of the tooth-pressure contact of their engagement with the cooperating pinions 104 of the appendage gears. This meshing engagement is one of constantly shifting tangency of the respective pitch diameters, and, therefore, the locus of the point of tangency is the pitch diameter of each internal gear.

In other words, the appendage gear pinions 104 roll around the ring 66 of internally cut spur gear teeth in the manner of ball bearings rolling around the outer raceway of a bearing assembly. The resultant force is one whose point of application is variable, and whose direction and magnitude are subject to variation.

In addition to this force, the output member 25 receives another force, since the bearings 61, 75 and 55 thereof rotatably support the trunnions 78 and 94, respectively, of the three inner auxiliary journal assemblies 70, and alternately the trunnions 123 and 110, respectively, of the outer auxiliary journal assemblies 71.

As stated, these trunnions, and the bearing openings in which they are disposed, register on the principal axes of the auxiliary journal assemblies, so that there is a reaction of force between said journal assemblies and the bearings of the output member. The combination of these two forces, that is, the gear engagement force and the force between the trunnions and the bearings, produces the full quota of energizing forces which impel the output member 25 to revolve.

The arrangement of the auxiliary journal assemblies 70 and 71 and their associated appendage gears 100 and 127 is such that this is accomplished without any appreciable vibration. Each journal assembly 70 and 71 has a heavy mass portion which is eccentric to the principal axis in one direction.

In the case of the assembly 70, this mass comprises the disc member 76, the raceway member 77, and the circular series of screws 87. To counteract this weight, and to provide balance, the appendage gear 100 is mounted eccentrically to the principal axis in the opposite direction.

In the case of the assembly 71, the heavy mass comprises the disc member 108, the raceway member 109, and the circular series of screws 117, and to compensate therefor, and to provide balance, the appendage gear 127 is mounted eccentrically to the principal axis in the opposite direction.

In addition, the series of three assemblies 70 are so positioned and arranged relative the series of three assemblies 71 that the one series counterbalances the other. It is believed that a minute inspection of Fig. 11 will do more to clarify this arrangement than will further lengthy description.

It is also to be remembered that the trunnions 37 and 38 are of equal weight and similarly disposed eccentrically of the center axis in opposite directions and that all of the axes of all of the gears, trunnions, and shafts are parallel.

It is assumed, as earlier indicated, that the control member 134 is held against rotation. The pinions 81 and 124 are in mesh therewith. The stationary control or ring gear 134 has on its pitch diameter a point of tangency with the pitch diameter of each pinion 81 and 124. Each pinion, relative to its own axis, that is, the principal axis of the auxiliary journal assembly, has an independent or absolute rotation, the speed of which coincides with that of the input shaft 34.

Supplementing such absolute rotation, there is a simultaneous rolling action which causes each pinion to advance bodily, while revolving, in the same direction as that in which the input shaft 34 and the output member are rotating.

The torque in each pinion 81 and 124 is engendered by the tooth pressure of the immobilized ring gear 134 acting on the radius of each pinion's pitch diameter. In balance with this torque there is present in each auxiliary journal assembly 70 and 71 another torque of equal and opposite magnitude. In other words, a torsional strain exists between the pinion torque and the auxiliary journal torque.

Each inner and outer auxiliary journal assembly 70 and 71 has a minimum of three points of application of forces, and the auxiliary journal torque referred to in the preceding paragraph is the resultant of three specific torques, one each on the principal and the two eccentric axes of the assembly.

Each of the appendage gears 100 and 127 likewise has three points of application of forces and three particular torques, but these three torques neutralize one another so that the resultant torque, unlike that exhibited in the auxiliary journal assembly, is zero.

And, while the torsional forces of each appendage gear are not exhibited in a symmetrical pattern corresponding to the geometric peripheral surfaces of the appendage gear itself, they are symmetrical about points on the pitch diameter thereof, although said points are subject to change on the pitch diameter circle.

Each appendage gear, it may be said, is analogous to the catalytic agent of a chemical contact process, and its principal function is to bind together or interlock the actuators in contact therewith, so as to smoothly guide their motion.

It should now be manifest that the transmission or transfer of power from the power shaft 34 to the driven shaft 35 is achieved whenever either of the control members 130 and 134 is caused to become immobile by being held against rotation, and that the power shaft constitutes a continuous rotary drive which is not affected by the transmission or non-transmission of its power to the driven shaft.

Braking neither control will leave the shaft 35 rotatably free, so that an extraneous force applied thereto may cause it to revolve in either direction, while the power shaft 34 continues its clockwise rotation unaffected thereby.

The internal ring gear on the control member 130, the external ring gear on the control member 134, and the pinions 81 and 124 constitute an apicyclic train as seen particularly in Fig. 14. The circular series of bearings 61, which rotatably support the trunnions 78 and 123, have their axes positioned in geometric symmetry about the center axis of the transmission, as best seen in Fig. 13. Each of the pinions 81 and 124 may travel bodily in either a clockwise or a counterclockwise direction about said center axis.

Reverting to Fig. 14, it is evident therefore that, if the pinions 81 and 124 are caused to move bodily in a clockwise direction, each of them will also rotate about its own axis in a clockwise direction while either control member is held stationary.

Whenever the control member 130 is held stationary, the output member 25 is given a torque to drive it in a counterclockwise direction. By braking the control member 134, the output member 25 is given a torque to drive it in a clockwise direction.

Additional torque is given the output member 25 by the rotary action of the pinions 104 and 129 of the appendage gear unit included in each of the inner and outer journal assemblies 70 and 71.

Therefore, as the pinions 81 and 124 are caused to travel bodily by the rotation of the output member in either direction, the appendage pinions 104 and 129 are caused to rotate bodily along an orbit concentric to the axis of the former pinions.

The pinions 104 and 129 always rotate in the same direction relative to their axes, and with them the spur gears 101 and 128. Since the spur gears 101 are in engagement with the internal gear ring openings 41 of the actuator 33, and the spur gears 128 are in engagement with the internal gear ring openings 46 of the actuator 32, rotation of the spur gears will impart the rotary motion to the actuators which has been explained.

The mechanical linkage and associated mechanical gearing described, together with the inherent and effective torsional strains engendered by its novel arrangement, the symmetrical pattern of the parts thereof, and the assimilation of them into a compact unitary structure provide a transmission which is not only highly efficient in operation, but which may be adapted to many useful purposes by one familiar with mechanisms of this type.

The adaptation of the invention to a portable power-operated hand tool has been illustrated and described. However, its use to impart a differential rotary movement from any rotary drive shaft to any co-axial ultimate or driven shaft is contemplated.

The pressure and torque indicating instruments 161 and 170, when the invention is incorporated in a hand tool, as illustrated, or in a similar device, may be standard pressure gauges with dials having calibrations thereon indicative of the pressure applied to the thumbpieces 151 and 152, respectively. In other words, the dial reading would be zero until one or the other thumbpiece is engaged, whereupon the dial reading would indicate the measure of pressure being applied.

For instance, assuming that the operator's task is to insert a multitude of similar screws, with the motor running and the ring gear control elements 130 and 134 both idling as before, the operator inserts the tip of the screwdriver into the kerf of one of the screws and initially exerts a light pressure on the thumbpiece 151. This will cause the output member to rotate clockwise and to thus turn the screw, causing it to advance a slight distance, while at the same time the indicating needle of the instrument 161 leaves the zero graduation and registers a small pressure.

Assuming that thereafter a more positive thumb pressure be applied, sufficient, for instance, to cause the needle to "take a jump" and then come to rest at an advanced calibration, the reading then exhibited would be an indication of the torque, when the screw was "home" and stopped advancing, and the amount of pressure required to insert the remainder of the screws would be demonstrated.

It is thus seen that the invention attains all of its intended objects and has features that are not only novel but practical as well. Since variations in the proportion, arrangement, and relationship of the components may be had without departing from the fundamental nature and principle of the invention, I do not intend that its scope be limited except as set forth by the appended claims.

What is claimed is:

1. Mechanism of the character described comprising a unitary assemblage of three spaced parallel plates constituting an output member, a shaft to be driven rigidly connected thereto, a pair of spaced parallel movable plates confined within the interstices obtaining between the intermediate and end plates of said output member, a circular series of bearings in said end plates concentric with but outwardly spaced from the center axis of said shaft to be driven, a similar series of internally cut ring gear openings in the intermediate plate of the output member, a circular series of alternate bearings and internally cut ring gear openings in each of said pair of spaced movable plates, a main journal for rotatably supporting the movable plates centrally thereof, a series of auxiliary journal assemblies each including a pinion member in spaced radial relation to the main journal, a power or input shaft rigid with said main journal and adapted to transmit rotary motion through said journal assemblies to said movable plates, a pair of control members in simultaneous engagement with each of the pinions of the auxiliary journal assemblies, gears associated with and supported by the auxiliary journal assemblies in engagement with the internally cut gear ring openings aforesaid, a cam member and a stud shaft included in each auxiliary journal assembly in rotary engagement with the bearings aforesaid, brake means to selectively immobilize either control member by the application of pressure, and visible means to indicate the degree of pressure applied.

2. Mechanism of the character described including two end plates, a central plate, and two intermediate plates in spaced relation, each of said end plates having a central bearing opening and a concentric series of spaced bearing openings, said center plate having a central bearing opening and a concentric series of spaced internally cut spur gear teeth openings, each of said intermediate plates having a central bearing opening and a concentric series of alternate bearing openings and internally cut spur gear teeth openings, a main journal on the center axis of the mechanism rotatably supported in the central bearing openings of the center plate and the end plates and in engagement with said central bearing openings of the intermediate plates, a rotary drive shaft rigid with said main journal to rotate the same for imparting rotary motion to said intermediate plates, a circular series of inner auxiliary journal assemblies and a similar series of outer auxiliary journal assemblies rotatably supported in the concentric bearing openings of said end and intermediate plates, an appendage gear unit associated with each inner and outer auxiliary journal assembly, each unit including a pinion in mesh with one of the internally cut spur gear teeth openings in said intermediate plates, bearings for each journal assembly mounted adjacent the internally cut spur gear teeth openings of the intermediate plates, pressure-responsive means to control the simultaneous rotation of the end and central plates in one direction, pressure-responsive means to control their simultaneous rotation in the opposite direction, an ultimate shaft to be driven rigid with one of said end plates, means adapted to apply pressure to either of said pressure-responsive means, and means to measure and visibly indicate the degree of pressure being applied.

3. Mechanism of the character described including two end plates, a center plate, and two intermediate plates maintained in spaced parallel relation by a circular series of rivets passing through aligned apertures in said end and center plates, a central bearing opening and a circular series of bearing and internally cut spur gear teeth openings concentric therewith formed in each intermediate plate, a central bearing opening and a circular series of bearing openings concentric therewith formed in each end plate, a central bearing opening and a circular series of internally cut spur gear teeth openings concentric therewith formed in the center plate, a main journal on the center axis of the mechanism supported for rotary movements in the central bearing openings of the end and center plates, a rotary drive shaft, a splined axial opening formed in the main journal in engagement with the drive shaft for causing said main journal to rotate with the latter to transmit rotary motion to said intermediate plates, a concentric series of equally spaced inner auxiliary journal assemblies and a similar series of equally spaced outer auxiliary journal assemblies supported for rotation in the series of bearings formed in the end and center plates, an appendage gear unit associated with each of the inner and outer journal assemblies each said unit including a pinion in mesh with one of the internally cut spur gear openings in said intermediate plates, bearings to support each auxiliary journal assembly adjacent the internally cut spur gear teeth openings of the intermediate plates, a pinion included in each auxiliary journal assembly, an annular control member provided with internal gear teeth in simultaneous engagement with each of said pinions, an annular control member provided with external gear teeth also in simultaneous engagement with each of said pinions, a shaft to be driven, an internally splined opening formed in a central boss integral with one of the end plates in engagement with an externally splined end portion of the shaft to be driven, pressure-responsive means for selectively braking one or the other control member, and means to measure and visibly indicate the pressure employed in so doing.

4. Mechanism of the character described including a front cover plate, a center plate, and a rear cover plate maintained in parallel spaced relationship by a circular series of securing and spacing elements, a rotatable outer actuator plate positioned between the front cover plate and the center plate, a similar inner actuator plate positioned between the rear cover plate and the center plate, a central bearing opening formed in each plate, an internally splined integrally formed boss projecting from the front cover plate, a circular series of six similarly spaced identical bearing openings formed in the web of said front cover plate concentric with the central bearing thereof, a like series of bearing openings in the rear cover plate, a circular series of three bearing openings and three internal gear openings alternately arranged formed in the web portion of the outer actuator plate concentric with the central bearing thereof, a like series of openings formed in the web portion of the inner actuator plate, a circular series of six internal gear openings formed in the web portion of the center plate concentric with the central bearing thereof, laterally extending annular flanges surrounding all of said openings in all of the plates, a main journal provided with a pair of diametrically opposed eccentric trunnions and having an internally splined opening and a bearing opening formed therein on the center axis of the mechanism, a circular series of three identical outer auxiliary journal assemblies and a circular series of three identical inner journal assemblies alternately positioned sixty degrees apart with their principal axes parallel to and on a circle concentric with the center axis of the mechanism, each of said assemblies being rotatably supported in said bearing openings provided in the front and rear cover plates aforesaid, an appendage gear unit associated with and rotatably supported by each auxiliary journal assembly for imparting rotary motion from the latter to one of said actuator plates, anti-friction bearings to support each auxiliary journal assembly between the front and rear cover plates, an annular series of six pinions one of which is included in each of the auxiliary journal assemblies projecting beyond the front cover plate, an internal and an external ring gear control element in simultaneous mesh with all of said pinions, pressure means for braking one or the other of said control elements, and means adapted to measure and visibly indicate the amount of pressure that is being applied.

5. A transmission adapted to transfer the power of a rotary drive shaft to an ultimate or driven shaft, comprising an output member composed of three parallel plates rigidly maintained in spaced relation, a pair of parallel actuator plates disposed one on each side of the central plate of said output member, a main journal provided with means for the rigid connection thereto of a rotary drive shaft, diametrically opposed integrally formed trunnions on the main journal each rotatably supporting one of the actuator plates centrally thereof, a central bearing in each of the plates composing the output member, a central bearing in each actuator plate, a circular series of bearings in the end plates of the output member concentric with the central bearings thereof and radially spaced therefrom, a circular series of internally cut gear teeth openings in the center plate of the output member concentric with the central bearing thereof and radially spaced therefrom, a circular series of alternate bearings and internally cut gear teeth openings in each actuator plate concentric with the central bearings thereof, a circular series of inner and outer auxiliary journal assemblies rotatably supported in said circular series of bearings in the end plates of said output member and adapted to rotatably motivate said actuator plates, an appendage gear unit supported by and associated with each auxiliary journal assembly for imparting rotary motion from the latter to one of said actuator plates, a pinion included in each of said assemblies, a pair of control members in engagement with all of said pinions to selectively govern the directional rotation of said output member, and means on the output member for the rigid connection thereto of a shaft to be driven.

6. A transmission adapted to transfer the power of a rotary drive shaft to an ultimate or driven shaft at a predetermined reduced rate of speed, including an output member composed of three parallel plates rigidly maintained in spaced relation by an annular series of spacing sleeves and fastener elements, a pair of parallel actuator plates disposed one on each side of the central plate of said output member, a main journal provided with means for the rigid connection thereto of a rotary drive shaft, diametrically opposed integrally formed trunnions on the main journal each rotatably supporting one of the actuator plates centrally thereof, a central bearing in each of the plates composing the output member, a central bearing in each actuator plate, a circular series of bearings in the end plates of the output member concentric with the central bearings thereof and radially spaced therefrom, a circular series of internally cut gear teeth openings in the center plate of the output member concentric with the central bearing thereof and radially spaced therefrom, a circular series of alternate bearings and internally cut gear teeth openings in each actuator plate concentric with the central bearing thereof, a circular series of inner and outer auxiliary journal assemblies rotatably supported in said circular series of bearings in the end plates of said output member and adapted to rotatably motivate said actuator plates, an appendage gear unit supported by and associated with each auxiliary journal assembly for imparting rotary motion from the latter to one of said actuator plates, a pinion included in each appendage unit for engagement with one of the internally cut gear teeth openings in said actuator plates, a pair of annular control members to selectively govern the rotational direction of said output member, one of said control members including an internal cut ring gear and the other including an external cut ring gear, and an internally splined projecting hub portion on the output member for the rigid connection thereto of a shaft to be driven.

7. In a transmission of the character described, a drive shaft, a coaxial shaft to be driven, a hollow main journal, means therein for the rigid connection thereto of said drive shaft, an output member composed of two parallel end plates and a parallel intermediate plate in rigid spaced relation, means on one end plate for the rigid connection thereto of said shaft to be driven, a pair of oppositely disposed diametrically opposed similar eccentric trunnions rigid with the main journal, a pair of actuator plates one of which is journaled on each of said eccentric trunnions for rotation therewith in the same direction in which said drive shaft rotates, a concentric series of inner auxiliary journal assemblies each including a pinion projecting beyond the end plate having the shaft to be driven rigidly connected thereto, a concentric series of outer journal assemblies each including a pinion projecting beyond the latter end plate, an appendage gear unit associated with and rotatably supported by each of said inner and outer journal assemblies and including a pinion in constant engagement with a portion of one of the actuator plates, a central bearing opening and a concentric series of bearing openings in the end plates, a central bearing opening and a concentric series of internally cut gear openings in the center plate of the output member, a central bearing opening and a concentric series of bearing openings and alternate internally cut gear openings in each actuator plate for cooperation with the openings in the plates of the output member to support said journal assemblies in proper position, a first annular member provided with an internal ring gear in simultaneous mesh with all of said pinions, a second annular member provided with an external ring gear also in simultaneous mesh with all of said pinions, and pressure-responsive means associated with each annular member to effect the immobilization thereof.

8. In a transmission of the character described including a power shaft and a coaxial shaft to be driven, a main journal rigidly connected to said power shaft, a rotatable output member including two end plates and a center plate in rigid parallel relation, means in the form of an internally splined boss on said output member to receive the shaft to be driven, a pair of circular bosses parallel with and extending one from each side of the main journal in diametrically opposed relation, an actuator plate journaled on each said boss for rotative movements thereabout, a circular series of spaced bearing openings concentric with its supporting boss and a similar series of spaced internally splined openings in each of the actuator plates, a circular series of aligned spaced bearing openings in the end plates and a circular series of spaced internally splined openings in the center plate of the output member each said series being concentric with the axes of both shafts aforesaid, a series of spaced inner auxiliary journal assemblies and a series of spaced outer auxiliary journal assemblies each rotatably supported in the aligned bearing openings of said output member end plates, an appendage gear unit associated with and supported for independent rotary movements by each inner and outer journal assembly and in engagement with a splined opening in the center plate and a similar opening in one actuator, a pinion projecting laterally from each inner and outer journal assembly, an annular brake member provided with an internal ring gear in constant simultaneous mesh with each of said pinions, an annular brake member provided with an external ring gear also in constant simultaneous mesh with each of said pinions, and means for selectively braking either of said brake members to control the rotary direction of said output member and the shaft which is connected thereto.

9. In a transmission of the character described including a power shaft and a coaxial shaft to be driven, a main journal having formed therein an axial internally splined cavity in engagement with the externally splined end of said power shaft, a rotatable output member comprising two parallel end plates and a parallel intermediate or center plate in rigid spaced relation, a laterally projecting boss centrally formed on that end plate of the output member remote from said main journal, an internally splined cavity formed in said boss in engagement with an externally splined portion of the shaft to be driven, an axial bearing in the main journal to rotatably support one extremity of the last named shaft, an integral trunnion projecting laterally from each side of the main journal in such manner that the center of one trunnion is diametrically opposite the center of the other, an actuator plate journaled centrally thereof on each trunnion for rotative movements thereabout, a circular series of three spaced bearing openings concentric with the center of its supporting trunnion and a similar series of three internally splined annular openings in each actuator plate, a circular series of six spaced aligned and symmetrically disposed bearings concentric with the axes of both shafts aforesaid in each end plate of the output member, a circular series of six spaced symmetrically disposed internal ring gear openings concentric with the axes of both shafts aforesaid in the center plate of the output member, a circular series of three spaced inner auxiliary journal assemblies and a circular series of three spaced outer auxiliary journal assemblies rotatably supported by the circular series of aligned bearings in the output member, bearings for each journal assembly adjacent the internally splined openings of the actuator plates, an appendage gear unit associated with and supported for independent rotary movements by each inner and outer journal assembly, each appendage unit including a pinion in engagement with one internal ring gear opening of the center plate of the output member and a gear in engagement with one splined opening of an actuator plate, an integral pinion on each journal assembly projecting laterally beyond the end plate of the output member remote from the main journal, an annular brake member provided with an internal ring gear in constant simultaneous mesh with each of said pinions, an annular brake member provided with an external ring gear also in constant simultaneous mesh with each of said pinions, and means for selectively braking either of said brake members.

10. The transmission mechanism of claim 9 in which the bearings for each journal assembly adjacent the internally splined openings of the actuator plate include an annular shoulder constituting an outer raceway formed in said plate, an annular shoulder constituting an inner raceway formed on the peripheral portion of each journal assembly, and a circular series of ball bearings between said outer and inner raceways.

11. The transmission mechanism of claim 9 in which each inner auxiliary journal assembly comprises an eccentric or cam member, a disc member having a portion thereof cut away, an annular member with a smooth rounded peripheral shoulder constituting the inner raceway for the antifriction bearing elements, a rigid stud projecting from said cam on one side thereof, a similar stud projecting from said cam on the opposite side thereof and terminating in a pinion, a dished out cavity formed in the periphery of the first named stud, a hub on the inner raceway member permanently secured to the last named stud, a series of spaced threaded apertures in said inner raceway member, a registering series of similar apertures in said disc member, screw elements each engaging a pair of registering apertures, a cavity formed by cutting away a portion of said hub and said raceway member, a trunnion formed on either side of the disc member, and a bearing cavity formed centrally in said cam member.

12. The transmission mechanism of claim 9 in which each inner auxiliary journal assembly comprises an eccentric or cam member, a disc member having a portion thereof cut away, an annular member with a smooth rounded peripheral shoulder constituting the inner raceway for the antifriction bearing elements, a rigid stud projecting from said cam on one side thereof, a similar stud projecting from said cam on the opposite side thereof and terminating in a pinion, a dished out cavity formed in the periphery of the first named stud, a hub on the inner raceway member permanently secured to the last named stud, a series of spaced threaded apertures in said inner raceway member, a registering series of similar apertures in said disc member, screw elements each engaging a pair of registering apertures, a cavity formed by cutting away a portion of said hub and said raceway member, a trunnion formed on either side of the disc member, and a bearing cavity formed centrally in said cam member, the axis of the pinion and studs rigid with the latter and one of the trunnions of the disc member being coincident with the principal axis of the journal assembly as a whole, which principal axis coincides with the planetary axes of the openings in the output member, the axis of the raceway member being offset radially in one direction relative said principal axis, and the axis of the cam member, the central bearing cavity therein and the other trunnion of the disc member being offset radially in the opposite direction relative said principal axis.

13. The transmission mechanism of claim 9 in which each outer auxiliary journal assembly comprises an eccentric or cam member, a disc member having a portion thereof cut away, an annular member with a smooth rounded peripheral shoulder constituting the inner raceway for the antifriction bearing elements, a rigid trunnion projecting from said cam on one side thereof, a stud projecting from the cam on the opposite side thereof, a dished out cavity formed in the periphery of the stud, a hub on the inner raceway member permanently secured to said stud, a series of spaced threaded apertures in said inner raceway member, a registering series of similar apertures in said disc member, screw elements each engaging a pair of registering apertures, a cavity formed by cutting away a portion of said hub and said raceway member, a rigid stud projecting from one side of the disc member and terminating in a pinion, a trunnion projecting from the other side of the disc, and a bearing cavity formed centrally in said cam member, the axis of the pinion and stud rigid with the disc member as well as the stud and trunnion rigid with the cam member being coincident with the principal axis of the journal assembly as a whole, which principal axis coincides with the planetary axes of the openings in the output member, the axis of the raceway member being offset radially in one direction relative said principal axis, and the axis of the cam member, the central bearing cavity therein and the trunnion of the disc member being offset radially in the opposite direction relative said principal axis.

14. The transmission mechanism of claim 9 in which the antifriction bearings which rotatably support the inner and outer auxiliary journal assemblies each comprise a circular series of spherical bearing elements, an inner raceway member included in an auxiliary journal assembly, and an outer raceway member formed adjacent an internal ring gear opening in an actuator plate.

15. A transmission comprising gearing and elements associated therewith, including a central rotary drive or input shaft, a main journal in rigid connection with and rotated by said shaft, a pair of actuator plates, a pair of diametrically opposed laterally projecting trunnions each supporting one actuator plate centrally of the latter for independent rotation about the trunnion simultaneous with the rotation of the trunnion itself, an annular series of internal cut gear openings and alternate bearing openings in one actuator on an orbit concentric with the axis of the main journal trunnion which supports the same, an annular series of internal cut gear openings and alternate bearing openings in the other actuator on an orbit concentric with the axis of the main journal trunnion which supports the same, a circular series of spur gears in engagement with the internal cut gear openings of one actuator, a similar series of spur gears in engagement with the internal cut gear openings of the other actuator, an output member consisting of three parallel plates including a center plate, an annular series of internal gear rings in the center plate, a circular series of pinions coaxial with said spur gears in engagement with said internal gear rings of the center plate, a circular series of cam members coaxial with said spur gears and pinions in engagement with said bearings in the actuators, a circular series of pinions projecting forwardly from the output member, an internal ring gear in constant and simultaneous mesh with each of the forwardly projecting pinions, an external ring gear also in constant and simultaneous mesh with each of the forwardly projecting pinions, and a central rotary driven or output shaft in rigid connection with the output member.

16. In a transmission of the character described, gearing and elements associated therewith including a rotary drive shaft, a rotary main journal unit operatively connected to one end thereof, bearings in which the main journal unit is supported for rotation, an auxiliary journal unit, bearings in which the auxiliary journal unit is supported for rotation, a shaft parallel with said drive shaft supported eccentrically in said auxiliary journal unit for independent rotation, a first spur gear and a second spur gear integral with said parallel shaft, an internal ring gear operated by the rotary main journal unit in engagement with the first spur gear for rotating said parallel shaft relative to the auxiliary journal unit which supports it, a rotatable output assembly of three parallel plates in rigid spaced relation including an intermediate and two end plates, an internal ring gear opening in said intermediate plate in mesh with the second spur gear of said parallel shaft for rotating the latter relative to the auxiliary journal unit which supports it, and a shaft to be driven operatively connected to one end plate of said output assembly, the latter shaft being coaxial with the rotary drive shaft aforesaid.

17. In a transmission of the character described, gearing and elements associated therewith including a drive shaft, a main journal operatively connected to one end thereof, bearings in which the main journal unit is supported for rotation, a plurality of auxiliary journal units, bearings in which each of the latter is supported for rotation, a shaft parallel with said drive shaft supported eccentrically in each auxiliary journal unit for independent rotation, a first spur gear and a second spur gear integral with each said parallel shaft, an internal ring gear operated by the rotary main journal unit in engagement with each first spur gear for rotating its integral parallel shaft relative to the auxiliary journal unit which supports it, a rotatable output assembly of three parallel plates in rigid spaced relation including an intermediate and two end plates, a plurality of internal ring gear openings in said intermediate plate each of which is in mesh with one of the second spur gears of each said parallel shaft for rotating the latter relative to the auxiliary journal unit which supports it, and a shaft to be driven operatively connected to one end plate of said output assembly, the latter shaft being coaxial with the rotary drive shaft aforesaid.

18. In a transmission of the character described, gearing and elements associated therewith including a drive shaft on the center axis of the transmission, a main journal member operatively connected to one end of the shaft, a rotary output assembly comprising an intermediate and a pair of similar end plates in rigid spaced parallel relation, one of a pair of similar actuator plates adjacent either side of said intermediate plate, bearings in the actuator plates and in the intermediate and one end plate of the output assembly for rotatably supporting the main journal member, a laterally extending trunnion on either side of the main journal for rotatably supporting the actuator plates centrally thereof, one or more inner and outer auxiliary journal units, bearings in the output assembly on a planetary orbit respective to said center axis to support each auxiliary journal unit, a shaft parallel with said center axis supported eccentrically in each auxiliary journal unit, a first spur gear and a second spur gear integral with each last named shaft, ring gear openings in the actuator plates and in the intermediate plate of the output member in engagement with the spur gears aforesaid, a driven shaft coaxial with the drive shaft operatively connected to one end plate of said output member, a bearing formed in the main journal member and a bearing in the other end plate of the output assembly to support one extremity of said drive shaft, a pinion included in each inner and outer auxiliary journal unit projecting laterally beyond one end plate, an internal ring gear in constant engagement simultaneously with all of said projecting pinions, an external ring gear likewise in constant engagement simultaneously with all of said projecting pinions, and means to selectively brake either the internal or the external ring gear.

19. In mechanism of the character described, a rotatably supported sun cam shaft, a pair of eccentrically offset diametrically opposed journals rigid therewith, a series of rotatably supported spaced planetary cam shafts each in axial registry with a point on an orbit line concentric with said shaft, a pair of eccentrically offset diametrically opposed journals on each planetary cam shaft, a connecting plate provided with a series of openings each to receive and rotatably support one of the pair of offset journals of each planetary cam shaft, and a central opening in said plate to receive one of the pair of offset journals of the sun cam shaft for rotatably supporting said plate.

CLIFFORD B. GODWIN.

REFERENCES CITED

The following references are of record in the file of this patent:

UNITED STATES PATENTS

| Number | Name | Date |
|---|---|---|
| 70,122 | Rochow | Oct. 22, 1867 |
| 890,107 | Van Decas | June 9, 1908 |
| 1,326,863 | Heinkel | Dec. 30, 1919 |
| 1,343,944 | Tomoda | June 22, 1920 |
| 1,696,468 | Buhr | Dec. 25, 1928 |
| 1,889,508 | Zens | Nov. 29, 1932 |
| 2,343,333 | Sharpe | Mar. 7, 1944 |
| 2,370,484 | Nabstedt | Feb. 27, 1945 |

FOREIGN PATENTS

| Number | Country | Date |
|---|---|---|
| 638,756 | France | June 2, 1928 |